United States Patent [19]
Lefranc et al.

[11] Patent Number: 5,558,594
[45] Date of Patent: Sep. 24, 1996

[54] LOAD DISTRIBUTING HELICAL PLANETARY GEAR TRANSMISSION

[75] Inventors: Bénédicte A. Lefranc, Paris; Hugues H. R. Linet, Courbevoie; Michel R. C. Virmoux, Colombes, all of France

[73] Assignee: Societe Hispano Suiza, Saint Cloud, Cedex, France

[21] Appl. No.: 356,590

[22] Filed: Dec. 15, 1994

[30] Foreign Application Priority Data

Dec. 15, 1993 [FR] France ................................. 93.15053

[51] Int. Cl.$^6$ ................................. F16H 57/08
[52] U.S. Cl. ........................... 475/347; 475/348
[58] Field of Search ........................... 475/331, 346, 475/347, 348

[56] References Cited

U.S. PATENT DOCUMENTS

| | | | |
|---|---|---|---|
| Re. 26,578 | 5/1969 | Naumann | 475/348 |
| 1,586,309 | 5/1926 | Hult . | |
| 2,749,778 | 6/1956 | Kuhn | 475/347 |
| 2,971,407 | 2/1961 | Katz | 475/347 |
| 3,178,966 | 4/1965 | Wildhaber | 475/346 |
| 3,227,006 | 1/1966 | Bowen | 475/348 X |
| 3,292,460 | 12/1966 | Fritsch | 475/347 |
| 3,303,713 | 2/1967 | Hicks . | |
| 4,004,471 | 1/1977 | Keske | 475/346 X |
| 5,368,528 | 11/1994 | Farrell | 475/348 |

FOREIGN PATENT DOCUMENTS

| | | |
|---|---|---|
| 1106128 | 12/1955 | France . |
| 1367343 | 9/1974 | United Kingdom . |

*Primary Examiner*—Charles A. Marmor
*Assistant Examiner*—Nathan O. Jensen
*Attorney, Agent, or Firm*—Bacon & Thomas

[57] ABSTRACT

A load distributing planetary gear or epicyclic transmission having a sun gear, an annulus gear and a planet wheel carrier supporting a plurality of planet wheels, all of the gears being helical and the planet wheels being simultaneously meshed with the sun gear and the annulus gear. Each planet wheel is mounted on a distal end of a flexible shaft, which is supported by the planet wheel carrier on an opposite end, by a journal which permits swivelling of the planet wheel. Each planet wheel is held in place by a component which is capable of sliding only in a plane extending substantially perpendicular to a plane passing through the axis of rotation of the planet wheel and the axis of rotation of the sun gear. The sliding component is offset axially along these axes relative to the planet wheel, preferably being located on the side of the planet wheel facing towards the planet wheel carrier. The sliding components constitute a reversal torque compensating device which prevents tipping or swivel movement of the planet wheel caused by the reversing torque due to the engagement of the helical gears.

7 Claims, 3 Drawing Sheets

5,558,594

LOAD DISTRIBUTING HELICAL PLANETARY GEAR TRANSMISSION

BACKGROUND OF THE INVENTION

The present invention relates to planetary gear or epicyclic transmissions, more particularly such transmissions having helical gears and means to distribute the load amongst a large number of planet wheels.

Epicyclic or planetary gear transmissions are, of course, well known in the art and allow the transmission of high power while exhibiting compactness and low weight. These characteristics make the transmissions particularly suitable for aeronautical applications. Such transmissions are capable of multiplying or reducing the rotational input speed.

In its simplest form, called a single stage, a transmission of this type comprises a central gear, called a sun gear, an outer, gear called an annulus gear, and one or more intermediary gears, or planet wheels, which are in simultaneous engagement with the sun gear and the annulus gear. The planet wheels rotate on shafts connected to a planet wheel carrier.

Depending upon the desired operation, one of the three components, the sun gear, the annulus gear, or the planet wheel carrier, are braked or held stationary while the other two components rotate. One of the rotating components receives the input rotation, whereas the other delivers the output rotational motion.

For a given amount of power to be transmitted, increasing the number of planet wheels and using high strength metals to fabricate the transmission elements reduces gear bulk and, consequently, the bulk and weight of the epicyclic transmission. On the other hand, the power dissipated in the transmission is less easily drained from it and the operational temperature of such a transmission will be higher.

Under such conditions of compactness and high operating temperatures, the transmitted load must be evenly distributed over all of the planet wheels, which may be achieved by mounting the planet wheels on flexible metal shafts. The flexible metal shafts are attached at one end to the planet wheel carrier, while the other end is free and supports the planet wheel by means of a journal and swivel device. The journal and swivel device may include a ball-type bearing with a swivel, to ensure these two function simultaneously and may include a spherical surface as one of the rolling paths. Devices of this type may also include a non-swiveling ball or roller bearing which cooperates with a separate swivel.

Such transmissions including the above described journal and swivel device are adequate when the transmission makes use of spur or herringbone gears, because each planet wheel automatically is aligned with its journal axis relative to the sun gear and to the annulus gear. However, spur gears entail the drawback of generating vibrations in the transmitted rotational motion, whereas herringbone, or double helical gears are costly and require high manufacturing accuracy in order that the transmitted load will be distributed over the teeth of the gear.

Helical gears are free from the above-mentioned drawbacks. Such gears are economical relative to the herringbone gears and allow vibration-free load transmission with excellent load distribution along the teeth. However, helical gears are subject to parasitic axial forces applied to the teeth and generate a torque tending to reverse the gears in the plane defined by the axes of the gears. In the case of planet wheels mounted in a swiveling manner, these helical planet wheels would be kept in place only by the pressure of their gear teeth against those of the sun gear and of the annulus gear, which would cause premature wear of the gear teeth.

SUMMARY OF THE INVENTION

A load distributing planetary gear or epicyclic transmission is disclosed having a sun gear, an annulus gear and a planet wheel carrier supporting a plurality of planet wheels, all of the gears being helical and the planet wheels being simultaneously meshed with the sun gear and the annulus gear. Each planet wheel is mounted on a distal end of a flexible shaft, which is supported by the planet wheel carrier on an opposite end, by a journal which permits swivelling of the planet wheel. Each planet wheel is held in place by a component which is capable of sliding only in a plane extending substantially perpendicular to a plane passing through the axis of rotation of the planet wheel and the axis of rotation of the sun gear. The sliding component is offset axially along these axes relative to the planet wheel, preferably being located on the side of the planet wheel facing towards the planet wheel carrier. The sliding components constitute a reversal torque compensating device which prevents tipping or swivel movement of the planet wheel caused by the reversing torque due to the engagement of the helical gears.

In a first embodiment of the invention, each planet wheel is mounted on a rolling and swivel bearing having a spherical rolling surface. The planet wheel is either fixedly attached to or forms the outer race of the rolling swivel bearing, while the inner race is fixedly attached to an end portion of the flexible shaft. The reversal torque compensating device consists of a second rolling bearing wherein the inner race of the bearing is fixedly attached to the planet wheel and the outer race of the bearing is attached to the planet carrier so as to slide only in a direction extending substantially perpendicular to a plane passing through the rotational axes of the planet wheel and the sun gear. The outer race may define opposite facing, sliding surfaces which are in sliding contact with surfaces formed on the planet wheel carrier to facilitate such sliding movement. Preferably, the second bearing, is offset towards the planet wheel carrier and displaced away from the plane of the planet wheel.

In a second embodiment of the invention, the planet wheel is supported on the distal end of the flexible shaft by a separate roller bearing and a separate swivel bearing which is interposed between the inner race of the roller bearing and the distal end of the flexible shaft to enable the planet wheel to pivot. In this particular embodiment the reverse torque compensating device comprises a guide member fixedly attached to the inner race of the roller bearing having a distal end portion which engages a channel formed in the planet wheel carrier. The channel is defined by walls extending in a direction substantially perpendicular to the plane passing through the axes of rotation of the planet wheel and the sun gear. Since the roller bearing prevents any relative swivelling movement between the planet wheel and the inner roller bearing race, the guide members prevent the planet wheel from tipping or swivelling due to the reverse torque. Preferably, the distal ends of the guide members which engage the channels are axially offset from the plane of the planet wheel towards the planet wheel carrier.

The invention offers the advantages of making possible very compact epicyclic transmissions without deforming components made of organic materials and, as a result, a transmission which is able to operate at high temperatures.

The present invention also renders it possible to build reducers comprising as many as seven planet wheels and transmitting 30 MW at 2,000 rpm at the output. The overload applied to one planet wheel relative to the others may be limited to 20% with the use of flexible mounting shafts and with a steel planet wheel bearing. This overload may be further limited to 10% by utilizing flexible mounting shafts and a titanium planet wheel bearing wherein the shafts are twice as flexible while having the same strength.

DETAILED DESCRIPTION OF THE PREFERRED EMBODIMENTS

Figure 1:
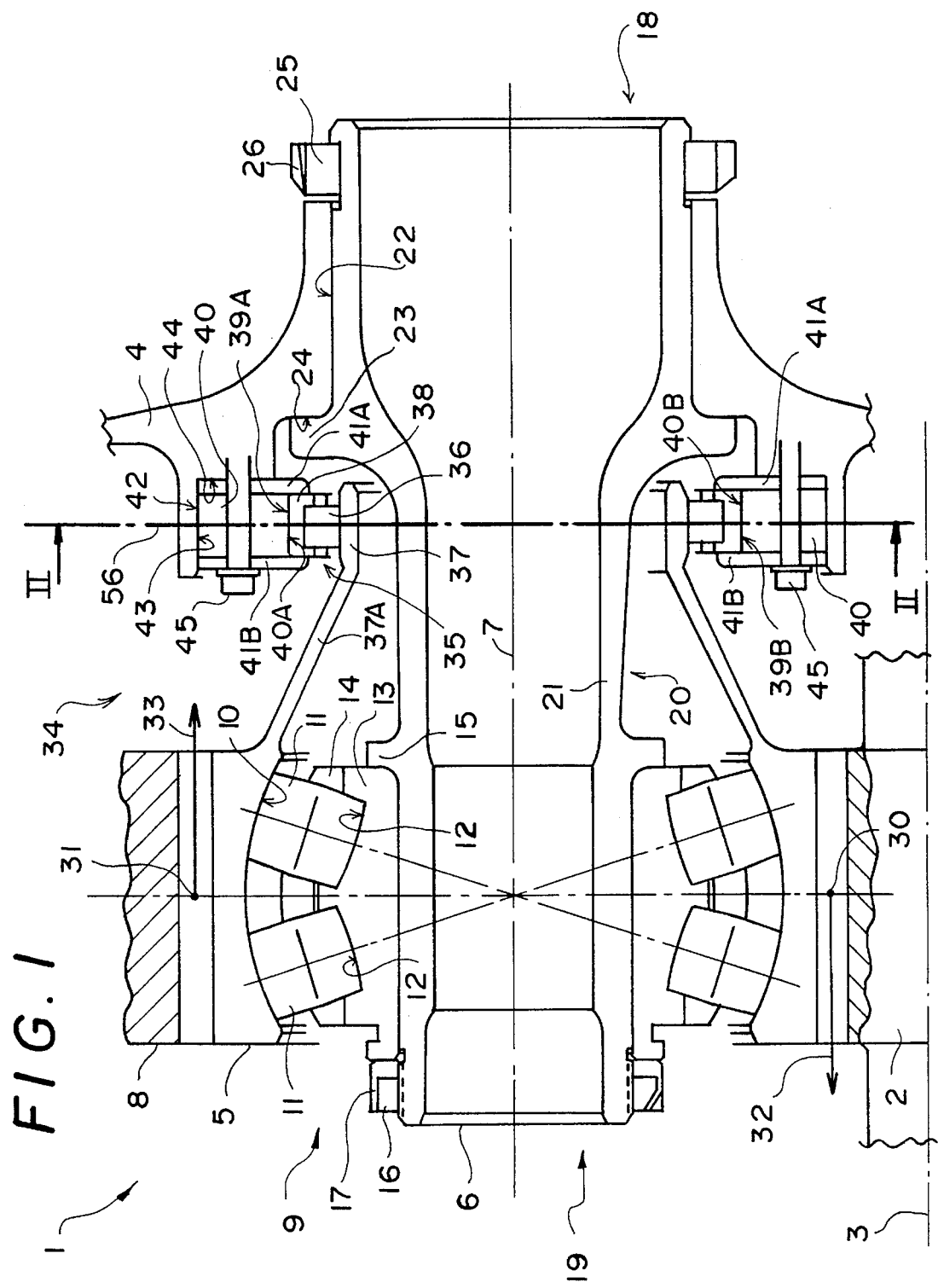
FIG. 1 is a longitudinal, cross-sectional view of a first embodiment of the load distributing planetary gear transmission according to the present invention.
Figure 2:
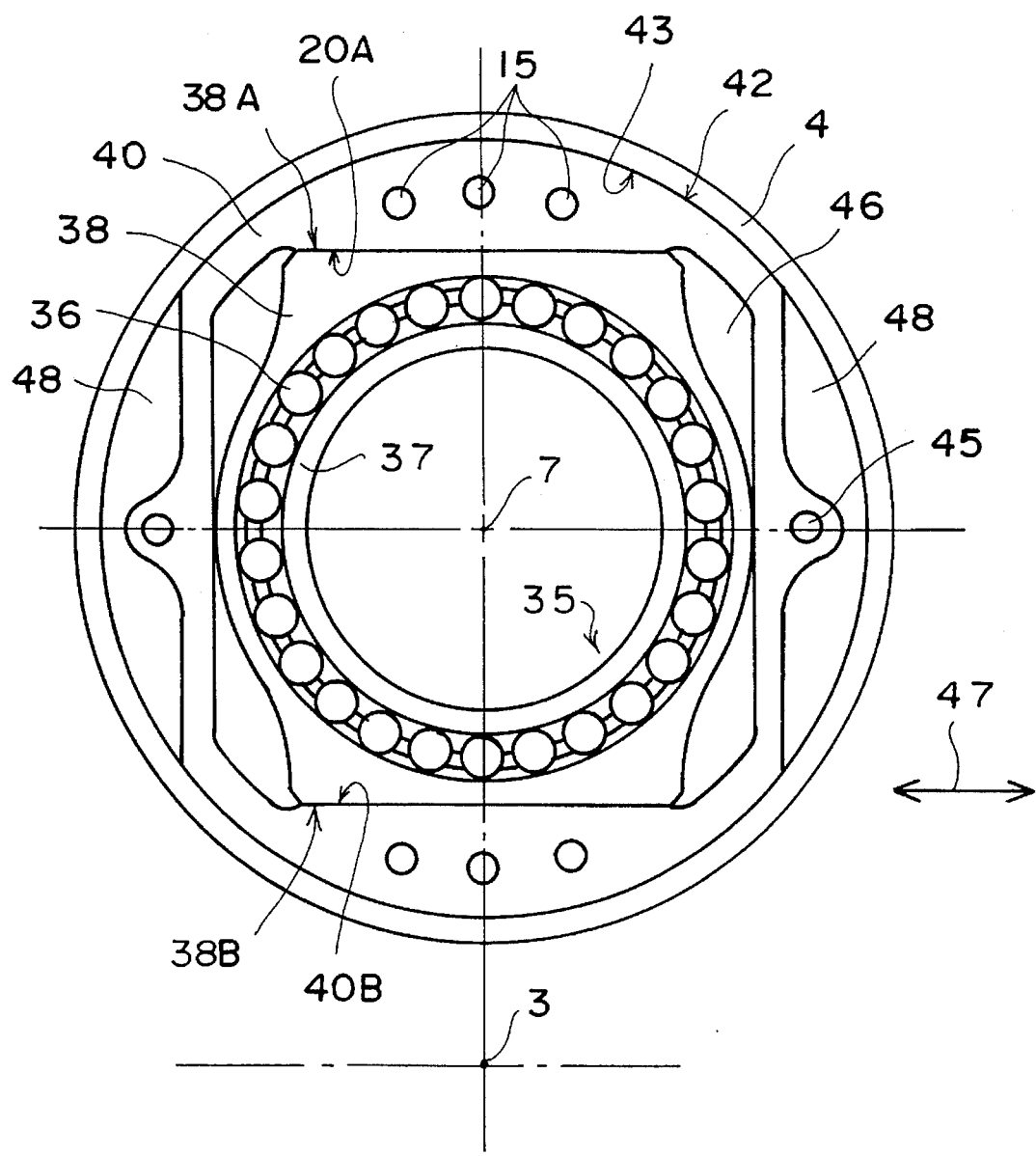
FIG. 2 is a cross-sectional view taken along line II—II in FIG. 1.

FIGS. 1 and 2 illustrate a first embodiment of the invention wherein the transmission 1 comprises a sun gear 2 rotatable about central axis 3, a planet wheel carrier 4 also having the axis 3 as a central axis and having mounted thereon one or more planet wheels 5 by shafts 6 such that the planet wheels are rotatable about a second central axis 7. The shaft 6 has one end 18 fixedly attached to the planet wheel carrier 4. The transmission also comprises an annulus gear 8 having inner helical gear teeth thereon which engage the helical gear teeth of the planet wheels 5. In turn, the helical gear teeth of the planet wheels 5 mesh with the helical gear teeth on the sun gear 2 simultaneously with their meshing engagement with the annulus gear 8.

When the epicyclic gear train is used as a speed reducer, the input rotary motion is through the sun gear 2. Depending upon the reduction ratio, either the planet wheel carrier 4 or the annulus gear 8 will be held stationary thereby causing the non-stationary element to be the rotating output member.

Each planet wheel 5 is attached to the distal end of flexible shaft 6 by a bearing assembly 9. In the embodiment illustrated in FIGS. 1 and 2, the bearing 9 is a rolling swivel bearing. The bearing structure, per se, is well known in the art. In this particular instance, the outer race of the bearing 9 is formed as an integral part of the planet wheel 5 and comprises an outer, spherical rolling surface 10 resting against the rollers 11, which may be barrel-shaped, as is well known in the art. The rollers 11, in turn, bear against rolling tracks 12 formed on the inner bearing race 13. The rollers 11 are circumferentially spaced apart from each other in known fashion by cages 14. As illustrated, preferably the bearing 9 comprises two sets of rollers.

The inner race 13 is fixedly attached to the shaft 6 by means of nut 16 threaded onto the end of the shaft 6 and lock washer 17 which urge the inner bearing race 13 against shoulder 15 formed on the shaft 6.

One end 18 of the shaft 6 is rigidly attached to the planet wheel carrier 4 while the opposite, distal end 19 is unsupported and bears the planet wheel 5 and the bearing 9. Between the opposite ends 18 and 19, the shaft 6 comprises a flexible zone 20 which preferably assumes a tubular form having a thin wall 21.

End 18 of shaft 6 may be attached to the planet wheel carrier 4 via a cylindrical bearing surface 22 which passes through a bore hole formed in the planet wheel carrier 4 with slight, or possibly negative (force fit) play. A shoulder 23 formed on the shaft 6 abuts against an inner surface 24 of the planet wheel carrier 4. The shaft 6 is locked into place on the planet wheel carrier 4 by nut 25 threaded onto the end 19 of the shaft 6 and lock washer 26 which bear against the planet wheel carrier 4.

Because of the flexibility of shaft 6, each planet wheel 5 may simultaneously press against the helical teeth of the sun gear 2 and the helical teeth of the annulus gear 8 allowing excellent load distribution between all of the planet wheels in the transmission. The slight bending of the shaft 6 causes an angular offset at its distal end 19 which supports the bearing 9. However, the meshing engagement between the planet wheels 5, with the sun gear 2 and the annulus gear 8 keeps the planet wheel 5 in its proper orientation due to the swiveling function allowed by the bearing 9. The bearing permits swiveling movement about an axis extending perpendicular to the plane passing through axes 3 and 7 at the center of the planet wheel 5.

The maximum overload applied to a planet wheel 5 equals the gap between meshing gear teeth divided by the flexibility of the shaft 6 wherein the gap depends upon manufacturing tolerances. The overload may be reduced by making the shaft 6 more flexible either by increasing the length of the thin tubular wall 21, or by reducing its diameter and/or thickness. Making the shaft 6 more flexible entails the drawback of lowering its strength, however. So as to not unduly weaken shaft 6, it is sometimes appropriate to select a material which with constant dimensions offers a Youngs modulus less than that of the initially selected material. Illustratively, if steel is replaced by a titanium alloy, such as TA6V, of which the Youngs modulus is one-half that of steel, the shaft flexibility may be doubled without degrading its strength.

Because the gears are helical, each planet wheel 5 is subjected at site 30 where it meshes with the sun gear 2 and at site 31 where it meshes with the annulus gear 8 to reaction forces 32 and 33, respectively, which extend parallel to the axis of rotation 7, but are exerted in opposite directions. These reaction forces 32 and 33 generate a reversing torque tending to make the planet wheel 5 swivel on tip about an axis extending perpendicular to a plane passing through the axes 3 and 7. Since the planet wheel 5 is mounted by a roller swivel bearing 9, it cannot oppose the reversing torque imposed thereon by the forces 32 and 33.

As a consequence, each of the planet wheels 5 cooperate with a reversal torque compensating means 34 for compensating the reversal torque. The reversal torque compensating means 34 prevents the planet wheels from swiveling or tipping about their axes due to the forces 32 and 33.

The reversal torque compensating device 34 comprises a second bearing 35 centered about the axis 7 and offset axially relative to the plane of the planet wheel 5 in a direction towards the planet wheel carrier 4. The second bearing 35 comprises a first race rigidly attached to the planet wheel 5 and a second race joined to the planet wheel carrier 4 so as to move in a direction perpendicular to the plane passing through the axes 3 and 7 relative to the planet wheel carrier 4.

In a preferred embodiment, the second bearing 35 comprises a plurality of cylindrical rollers 36 interposed between an inner race 37 and an outer race 38. The inner race 37 is fixedly connected to the planet wheel 5 by a cylindrical or frusto-conical wall 37A. The outer race 38 defines two planar, mutually parallel, oppositely facing sliding surfaces 39A and 39B which extend substantially perpendicular to a plane passing through the axes 3 and 7. The outer race 38 slides on the surfaces 39A and 39B relative to the planet wheel carrier 4 in a direction substantially perpendicular to the plane passing through axes 3 and 7 between the parallel, oppositely facing surfaces 40A and 40B formed on guide 40. The surfaces 40A and 40B are also planar in configuration, mutually parallel and extend perpendicular to the plane passing through the axes 3 and 7. The sliding movement to keep the planet wheel 5 in position is the resultant of two elementary sliding motions: the first carried out by the surfaces 39A, 39B on surfaces 40A and 40B in a direction perpendicular to the plane passing through the axes 3 and 7; and the second is carried out by the inner race 37 and the rollers 36 in the direction of axis 7, the set of elementary motions being equivalent to one sliding motion in a plane parallel to the axis 7 and perpendicular to the plane passing through the axes 3 and 7.

The width (dimension parallel to axis 7) of the guide 40 is slightly larger than that of the outer race 38. The guide 40 and the race 38 are both located between two plates 41A and 41B which extend generally radially relative to the axis 7 and which partly cover the side surfaces of the race 38 to complement the guidance of the race 38 in a direction perpendicular to the plane passing through the axes 3 and 7.

The guide 40, as well as the plates 41A and 41B, are bounded radially outwardly from axis 7 by a cylindrical surface 42 which bears against a cylindrical wall 43 formed on the planet wheel carrier 4, the diameter of which is slightly larger than that of the surface 42. The cylindrical wall 43 bounds a bore hole which is also bounded at one end by a planar wall 44 which extends generally radially relative to the axis 7 so as to define an end of the bore hole.

Plate 41A, guide 40 with the outer race 38 and rollers 36, and plate 41B are mounted in sequence inside the bore hole against the radial wall 44. This assembly is maintained in contact with the surface 44 by a plurality of screws 45 passing through the plate 41B, guide 40 and plate 41A, and into the wall 44 on the planet wheel carrier 4.

As best seen in FIG. 2, the guide 40 is located in the bore hole of the planet wheel carrier 4 and is centered on the axis 7 by contact between its outer surface 42 and the cylindrical wall 43 of the bore hole. The guide 40 comprises an inner clearance 46 relative to the outer race 38 of the bearing 35. This allows race 38 to move inside the clearance 46 in a direction 47 perpendicular to the plane passing through the axes of rotation 3 and 7. Race 38 slides on its surfaces 39A and 39B between the surfaces 40A and 40B of the guide 40. Additional openings or clearances 48 may be formed in the guide 40 so as to reduce the weight of the assembly.

Figure 3:
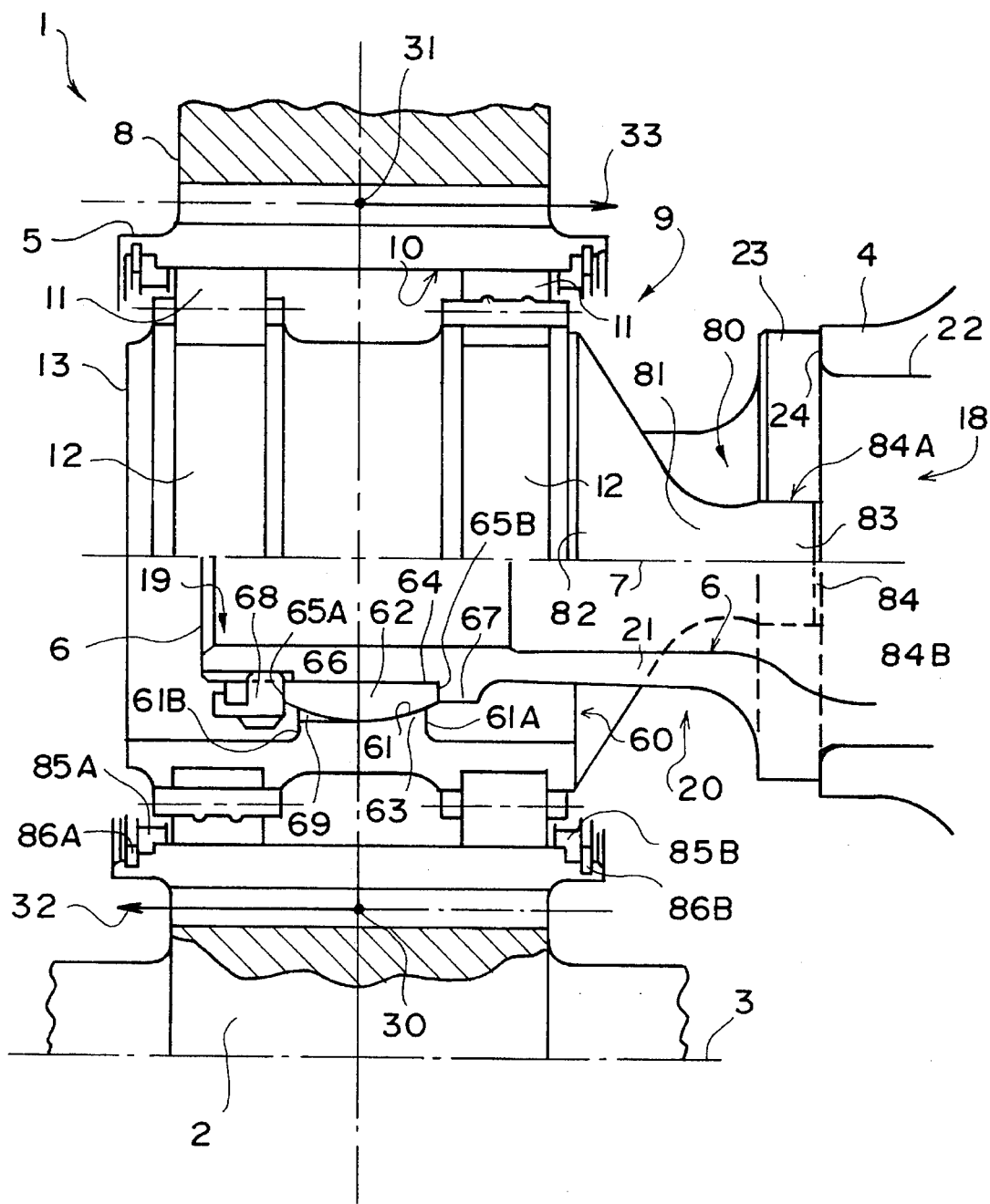
FIG. 3 is a longitudinal, cross-sectional view illustrating a second embodiment of the load distributing planetary gear transmission according to the present invention.

FIG. 3 illustrates a second embodiment of the load distributing planetary gear transmission according to the present invention. Elements in common with the previously described embodiment have been assigned the same numbers which include the transmission 1, the sun gear 2, the annulus gear 8 and the axis of rotation 3. This embodiment also has at least one planet wheel 5 having helical gear teeth thereon which mesh simultaneously with the helical gear teeth formed on sun gear 2 and the helical gear teeth formed on annulus gear 8. Again, each planet wheel 5 is attached to a distal end 19 of shaft 6 by a bearing 9, the shaft 6 being rigidly attached at its opposite end 18 to planet wheel carrier 4. The shaft is concentric about axis 7 which is also the axis of rotation of the planet wheel 5. As in the previously described embodiment, shaft 6 has a cylindrical bearing surface 22 which fits into a bore hole formed on the planet wheel carrier 4 such that a shoulder 23 of the shaft 6 abuts surface 24 formed on the planet wheel carrier 4 wherein the surface 24 is generally planar in configuration and extending radially relative to the axis 7 and faces towards the planet wheel 5. In this manner, the shaft 6 is fixedly attached to the planet wheel carrier 4 by nut 25 and lock washer 26 as illustrated in FIG. 1.

Again, the shaft 6 comprises a flexible zone 20 between its opposite ends which comprises a thin cylindrical or frusto-conical wall 21.

In this particular embodiment, the planet wheel 5 is supported on the distal end 19 of the shaft 6 by bearing 9 which comprises a roller type bearing having two sets of cylindrical rollers 11 in contact with a cylindrical surface 10 formed on the planet wheel 5 and also in contact with cylindrical tracks 12 formed on the inner race 13 of the bearing 9. The inner race 13 defines a central opening 60 and has formed at its center a spherical annular bearing surface 61. The spherical bearing surface 61 is concave, centered on the axis 7 and is axially bounded by two radially extending annular surfaces 61A and 61B.

A swivel bearing 62 comprises a convex, outer spherical surface 63 which slidably bears against spherical concave bearing surface 61 enabling the bearing assembly and the planet wheel 5 to swivel with respect to the end of shaft 6 about an axis extending perpendicular to the plane passing through the axes 3 and 7 and extending through the center of the planet wheel 5. In a preferred embodiment, the swivel 62 assumes the shape of an annulus bounded on the inside by cylindrical surface 64 and bounded axially by two radially extending surfaces 65A and 65B. The swivel 62 is mounted on the shaft 6 by clamping its inner surface 64 on a cylindrical bearing surface 66 formed on the shaft 6 and by abutting surface 65B against shoulder 67, also formed on shaft 6. The swivel 62 is affixed in this position by means of a self-locking nut 68 threaded onto the end of shaft 6 into engagement with the surface 65A on the swivel 62. In order to mount the swivel 62 inside the race 13, the diameter of the opening 60 is slightly larger than the largest outside diameter formed by the spherical surface 63.

Additional clearances 69, which are symmetrical relative to the axis 7, are defined inside the inner race 13 and establish communication between the peripheral portions of the inner space defined by the concave spherical surface 61 and the remainder of the opening 60 to one side of the race 13, the clearances 69 issuing, in this particular instance, through the surface 61B. The clearances 69 are externally bounded by two cylindrical surface portions about axis 7 with a diameter at least equal to that of the maximum diameter of the spherical surface 61. Clearances 69 are further bounded laterally by two parallel planes symmetrical to the axis 7 separated by a dimension slightly larger than the width of the swivel 62, i.e., the distance between the surfaces 65A and 65B which axially bound the swivel 62.

To install the swivel 62 inside the inner race 13, the swivel must first be inserted into the opening 60 from the side through which the clearances 69 issue such that its axis is perpendicular to the axis 7 and its side surfaces 65A and 65B are aligned with the surfaces which laterally bound the clearances 69. The swivel 62 is inserted into the clearances 69 until its outer spherical surface 63 makes contact with the concave spherical surface 61. The swivel 62 is then rotated by 90 degrees such that its central axis coincides with axis 7 and whereby the swivel is mounted in the race 13 inside its concave surface 61.

The planet wheel 5 is first mounted to the bearing 9 and this assembly is placed on shaft 6 until the swivel 62 makes contact with the shoulder 67. Installation of self-locking nut 68 against the surface 65A will hold the assembly in position on the shaft 6.

Because the elements of transmission 1 each have helical gears, the planet wheel 5 is, again, subjected at site 30 where it meshes with sun gear 2 and at site 31, where it meshes with annulus gear 8, to reaction forces 32 and 33, respectively extending in opposite directions substantially parallel to the axis of rotation 7. The reaction forces 32 and 33 generate a reversal torque tending to tip or swivel the planet wheel 5 about an axis extending perpendicular to the plane passing through axes 3 and 7 and the center of the planet wheel 5. As in the previous embodiment, the bearing 9 illustrated in FIG. 3 is unable to oppose the reversal torque. Accordingly, this embodiment of the transmission I comprises a reversal torque compensating device 80 to prevent such tipping or swivelling of the planet wheel 5.

The reversal torque compensating device 80 comprises guide members 81 located on diametrically opposite sides relative to axis 7 and extending in a plane perpendicular to the plane passing through axes 3 and 7, intersecting the plane along the axis 7. One end 82 of the guide members 81 is rigidly joined to the inner race 13 of the bearing 9 and the opposite, distal end 83 of each guide member 81 is located, with a slight clearance, between walls 84A and 84B which define therebetween a channel 84. The walls 84A and 84B and therefore, channel 84, are stationary relative to the planet wheel carrier 4 and may be formed as part of the planet wheel carrier. In a preferred embodiment, channels 84 are located in shoulder 23 of the shaft 6 which is fixedly attached to the planet wheel carrier 4. Walls 84A and 84B defining the channels 84 are planar in configuration, mutually parallel and extend parallel to the axis 7 and perpendicular to the plane passing through the axes 3 and 7.

Accordingly, the reversal torque compensating device prevents the inner race 13 of the bearing 9 from swiveling or tipping about the swivel 62 about an axis extending perpendicular to the plane passing through axes 3 and 7 and through the center of the planet wheel 5. Furthermore, device 80 prevents the race 13 from rotating on the swivel 62 about axis 7 caused by forces exerted on the bearing 9 through the rotating planet wheel 5.

Aside from these limitations, the reversal torque compensating device 80 retains all of the degrees of freedom of the race 13 relative to the end of shaft 6. The compensating device 80 may also include a single guide member 81. However, in this case, there will arise a radial force on the swivel 62 increasing the wear of the swivel and hampering the travel of the race 13 about the swivel 62.

In order to prevent the planet wheel 5 from moving along the axis of rotation 7, the surface 10 on which the rollers 11 are engaged, may be bounded at its opposite axial ends by rings 85A and 85B which are attached to the planet wheel 5 by spring clips 86A and 86B.

The foregoing description is provided for illustrative purposes only and should not be construed as in any way limiting this invention, the scope of which is defined solely by the appended claims.

We claim:

1. A load distributing planetary gear transmission comprising:

a) a sun gear having helical gear teeth, the sun gear having a first central axis;

b) an annulus gear concentrically disposed around the sun gear and having helical gear teeth;

c) at least one planet wheel having helical teeth in meshing engagement with the helical teeth of the sun gear and of the annulus gear, the at least one planet wheel having a second central axis substantially parallel to, but spaced from the first central axis;

d) a planet wheel carrier having at least one flexible shaft extending therefrom;

e) swivel bearing means connecting the at least one planet wheel to the at least one flexible shaft such that the at least one planet wheel is rotatable about the second central axis; and, f) reversal torque compensating means connected to the planet wheel and the planet wheel carrier to prevent pivoting movement of the planet wheel about an axis extending perpendicular to a plane passing through the first and second central axes, the reversal torque compensating means comprising a bearing assembly having:

i) a first race fixedly attached to the at least one planet wheel and, ii) a second race slidably connected to the planet wheel carrier so as to slide with respect to the planet wheel carrier only in a direction substantially perpendicular to a plane passing through the first and second central axes.

2. The load distributing planetary gear transmission of claim 1 wherein the reversal torque compensating bearing assembly is displaced from the at least one planet wheel along the second central axis toward the planet wheel carrier.

3. The load distributing planetary gear transmission of claim 1 wherein the second race of the reversal torque compensating bearing comprises two first substantially parallel, planar sliding surfaces.

4. The load distributing planetary gear transmission of claim 3 wherein the planet wheel carrier has two second substantially parallel planar sliding surfaces which slidably contact the two first substantially parallel planar sliding surfaces.

5. The load distributing planetary gear transmission of claim 4 wherein the first and second substantially parallel planar sliding surfaces extend substantially perpendicular to a plane passing through the first and second central axes.

6. A load distributing planetary gear transmission comprising:

a) a sun gear having helical gear teeth, the sun gear having a first central axis;

b) an annulus gear concentrically disposed around the sun gear and having helical gear teeth;

c) at least one planet wheel assembly including a planet wheel having helical teeth in meshing engagement with the helical teeth of the sun gear and of the annulus gear, the planet wheel having a second central axis substantially parallel to, but spaced from the first central axis, wherein the at least one planet wheel assembly comprises a planet wheel bearing having an outer race and an inner race;

d) a planet wheel carrier having at least one flexible shaft extending therefrom;

e) swivel bearing means connecting the at least one planet wheel assembly to the at least one flexible shaft such that the planet wheel is rotatable about the second central axis; and, f) reversal torque compensating means to prevent pivoting movement of the planet wheel about an axis extending perpendicular to a plane passing through the first and second central axes, comprising:
  i) at least one guide member connected to the at least one planet wheel assembly, the at least one guide member having a distal end portion;
  ii) walls defining a channel therebetween fixed in relation to the planet wheel carrier and located such that the distal end portion is received in the channel between the walls wherein the walls extend substantially perpendicular to the plane passing through the first and second central axes;
  iii) two guide members fixedly connected to the inner race of the planet wheel bearing, the two guide members located on opposite sides of the plane passing through the first and second central axes and each having a distal end portion; and,
  iv) walls defining two channels located such that each channel receives the distal end portion of a guide member.

7. The load distributing planetary gear transmission of claim 6, wherein the walls are located on a shoulder of the flexible shaft.

* * * * *